United States Patent [19]

Akamatsu et al.

[11] 4,172,991
[45] Oct. 30, 1979

[54] AC CURRENT CONTROL SYSTEM FOR AC POWER SUPPLY

[75] Inventors: Masahiko Akamatsu; Masaharu Udaka; Munehiko Mimura, all of Amagasaki, Japan

[73] Assignee: Mitsubishi Denki Kabushiki Kaisha, Tokyo, Japan

[21] Appl. No.: 873,949

[22] Filed: Jan. 31, 1978

[30] Foreign Application Priority Data

Jan. 31, 1977 [JP] Japan .................. 52/10066

[51] Int. Cl.² .............................. H02P 5/40
[52] U.S. Cl. .................. 318/722; 318/798
[58] Field of Search ............. 318/227, 230, 231, 722, 318/798

[56] References Cited

U.S. PATENT DOCUMENTS

| | | | |
|---|---|---|---|
| 3,512,067 | 5/1970 | Landau | 318/227 |
| 3,593,083 | 7/1971 | Blaschke | 318/227 |
| 3,919,609 | 11/1975 | Klautschek et al. | 318/227 |
| 4,001,660 | 1/1977 | Lipo | 318/227 |
| 4,019,105 | 4/1977 | Cornell et al. | 318/227 |
| 4,088,934 | 5/1978 | D'Atre et al. | 318/227 |

Primary Examiner—Gene Z. Rubinson
Attorney, Agent, or Firm—Oblon, Fisher, Spivak, McClelland & Maier

[57] ABSTRACT

An A.C. current control system for an A.C. power supply device for feeding a load comprises a closed control loop for controlling the power supply device on the basis of results of comparison between an output signal from a reference current waveform generator for generating a reference current waveform and an output signal from a load current waveform detector for detecting the waveform of load current. A load voltage detector is provided, the output signal from which is positively fed back to the closed control loop for compensating deviation in the current control due to electromotive force or like factors of the load.

8 Claims, 12 Drawing Figures

AC CURRENT CONTROL SYSTEM FOR AC POWER SUPPLY

BACKGROUND OF THE INVENTION

1. Field of the Invention

The present invention relates to an A.C. current control system for a controlled A.C. power supply device destined to supply a controlled A.C. current of a predetermined waveform pattern to an A.C. load.

2. Description of the Prior Art

For the controlled A.C. power supply device of the above type, there have been hitherto known a cyclo converter and a pulse width modulation (PWM) inverter in which semiconductor switches such as thyristors are employed. In order to have a better understanding of the present invention, description will be first made on a typical example of the heretofore known A.C. current control system for a power supply device shown in FIG. 1 of the accompanying drawings. Referring to this figure, reference numeral (100) generally denotes a control circuit for controlling A.C. current supplied from a power supply device (200) to a load (300) such as an electric motor M having a field winding (320) adapted to be energized from a field current control circuit (400). The control circuit (100) comprises a voltage controller (101), a voltage-to-frequency converter (102), a waveform pattern generator (103), current controllers (111) to (113), a gate signal generator (107), a voltage detector (105) and a rectifier circuit (104). Reference symbol $V_s$ designates a reference voltage, $I_s$ represents a reference current, $I_u$, $I_v$ and $I_w$ represent individual phase currents, $F_s$ represents a speed command signal, $P_s$ represents a command pulse train corresponding to the input speed command signal $F_s$, $I_{su}$, $I_{sv}$ and $I_{sw}$ represent reference phase currents, $I_{fu}$, $I_{fv}$ and $I_{fw}$ represent feedback currents for the respective phases, and $V_{su}$, $V_{sv}$ and $V_{sw}$ represent power supply command or control voltages for the respective phases.

The control circuit (100) has various functions for controlling electric power supplied to the load (300). The phase feed voltages are detected by the voltage detector (105) and supplied to the voltage rectifier (104), the output from which is a rectified voltage $V_d$ adapted to be utilized as a feedback control voltage. The voltage controller (101) receives the feedback voltage $V_d$ and the reference voltage $V_s$ thereby to arithmetically determine any deviation of the feedback voltage $V_d$ from the reference voltage $V_s$ and produce the reference current $I_s$. On the other hand, the speed command voltage $F_s$ is converted into the command pulse train $P_s$ through the voltage-frequency converter (102). The pattern generator (103) serves to generate reference phase currents $I_{su}$, $I_{sv}$ and $I_{sw}$ of a predetermined waveform pattern on the basis of the reference current $I_s$ and the command pulse train $P_s$. Such waveform pattern may be of sine, trapezoidal or the like shape. The feedback current signals $I_{fu}$, $I_{fv}$ and $I_{fw}$ are detected by appropriate current detectors (114), (115) and (116) such as current transformers and supplied to the current controllers (111), (112) and (113) to be compared with the reference current signals $I_{su}$, $I_{sv}$ and $I_{sw}$, respectively. The output voltage signals $V_{su}$, $V_{sv}$ and $V_{sw}$ from the controllers (111), (112) and (113) which represent deviations of the feedback current signals $I_{fu}$, $I_{fv}$ and $I_{fw}$ from the respective reference current signals $I_{su}$, $I_{sv}$ and $I_{fv}$ constitute the voltage control signals $V_{su}$, $V_{sv}$ and $V_{sw}$ for controlling the phase feed voltages supplied from the power supply device (200) to the load (300). The gate control circuit (107) responds to the voltage command signals $V_{su}$, $V_{sv}$ and $V_{sw}$ to generate corresponding gate control signals which are applied to gate electrodes of the semiconductor controlled switches such as thyristors constituting the power supply device (200) for controlling the on-off operations of the switches. In this manner, the A.C. power which is controlled so as to be substantially proportional to the voltage command signal $V_s$ is supplied to the load (300) from the A.C. power supply device (200). By virtue of the provision of such closed control loop, the A.C. current supplied to the load (300) can be controlled by the phase feed voltage so as to follow the reference current $I_s$ of the predetermined waveform pattern.

It is to be noted that the load (300) adapted to be fed from the current supply and control system such as described above is in many cases constituted by an inductive load or a load capable of producing an internal electromotive force. The latter load may be exemplified by polyphase alternating machines such as inductive motors, synchronous motors or the like.

FIG. 2 illustrates schematically in a functional transfer block diagram the principle of the current control loop of the hitherto known control system described above. The reference numeral (200) designates the A.C. power supply device, while the load is designated by the reference numeral (300) as is in the case of FIG. 1. Reference symbol $I_s$ represents the reference current, $I_a$ represents the phase current, and $V_a$ represents the phase feed voltage. The symbol $V_s$ represents the phase voltage command signal.

It is assumed that the load (300) is constituted by an electric motor producing an internal electromotive force. In other words, the motor is inherently imparted with an current control loop having a feedback control quantity $e_f$. As described hereinbefore, the voltage command signal $V_s$ and hence the feed voltage $V_a$ supplied to the load (300) are determined by deviation of the actual feed current $I_a$ from the reference current $I_s$. However, since the current to be controlled will respond to the difference between the feed voltage $V_a$ and the internal electromotive force $e_f$, the deviation or the command voltage $V_s$ derived therefrom is required to have an amplitude increased for a magnitude corresponding to the internal electromotive force $e_f$. Accordingly, in the case of the load such as the electric motor exhibiting intrinsically the internal electromotive force, the current control deviation (instantaneous deviation including absolute deviation and phase deviation) will tend to be increased. In particular, in the case of a variable speed polyphase A.C. motor, the current control deviation is excessively increased in a high speed region due to the remarkable increase in the electromotive force, making it impossible or at least difficult to control the current waveform in the desired sine or trapezoidal form, whereby the range in which the motor speed can be varied is disadvantageously restricted. Further, the hitherto known power supply control system has been disadvantageous in that the torque of a required magnitude cannot be attained in the high speed range of the motor. In general, the conventional power supply control system for a varying load is undesirably susceptible to undergoing great deviations in respect of the current waveform to be controlled.

SUMMARY OF THE INVENTION

Accordingly, an object of the invention is to provide an apparatus for feeding a variable load with an A.C. current which is controlled in respect to the waveform thereof while reducing deviations in the current control signal.

In view of the above and other objects which will become more apparent as description proceeds, there is provided according to an aspect of the invention an A.C. current control system for an A.C. power supply which comprises a closed control loop for controlling the power supply device on the basis of results of comparison between an output signal from a reference current waveform generator means for generating a reference current waveform and an output signal from a load current waveform detector means for detecting the waveform of the load current, and a load voltage detector means for detecting a load voltage, wherein the output from the load voltage detector means is positively fed back to the closed control loop. With such an arrangement of the A.C. current control system, it is possible to reduce the deviation of the current supplied from the A.C. power supply device to an A.C. load susceptible to undergoing variations, the current being controlled in respect to the waveform thereof.

DESCRIPTION OF THE PREFERRED EMBODIMENTS

Figure 1:
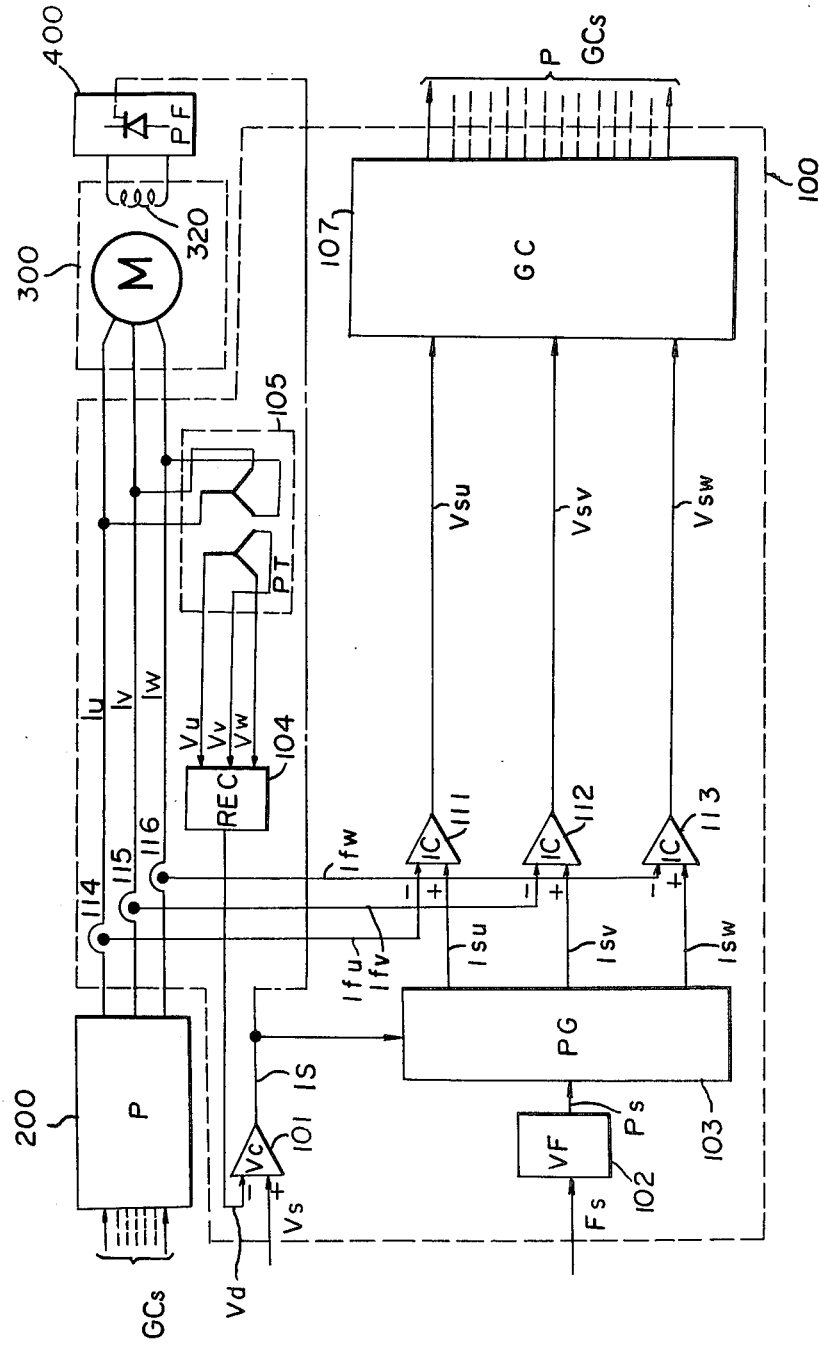
FIG. 1 shows in a schematic circuit diagram an example of a hitherto known A.C. current control system for a power supply device.
Figure 2:
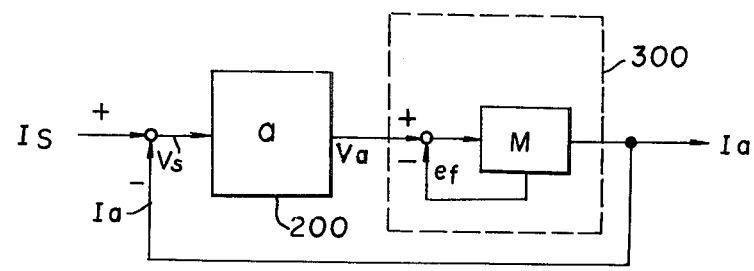
FIG. 2 is a block diagram to illustrate control operation of the system shown in FIG. 1.
Figure 3:
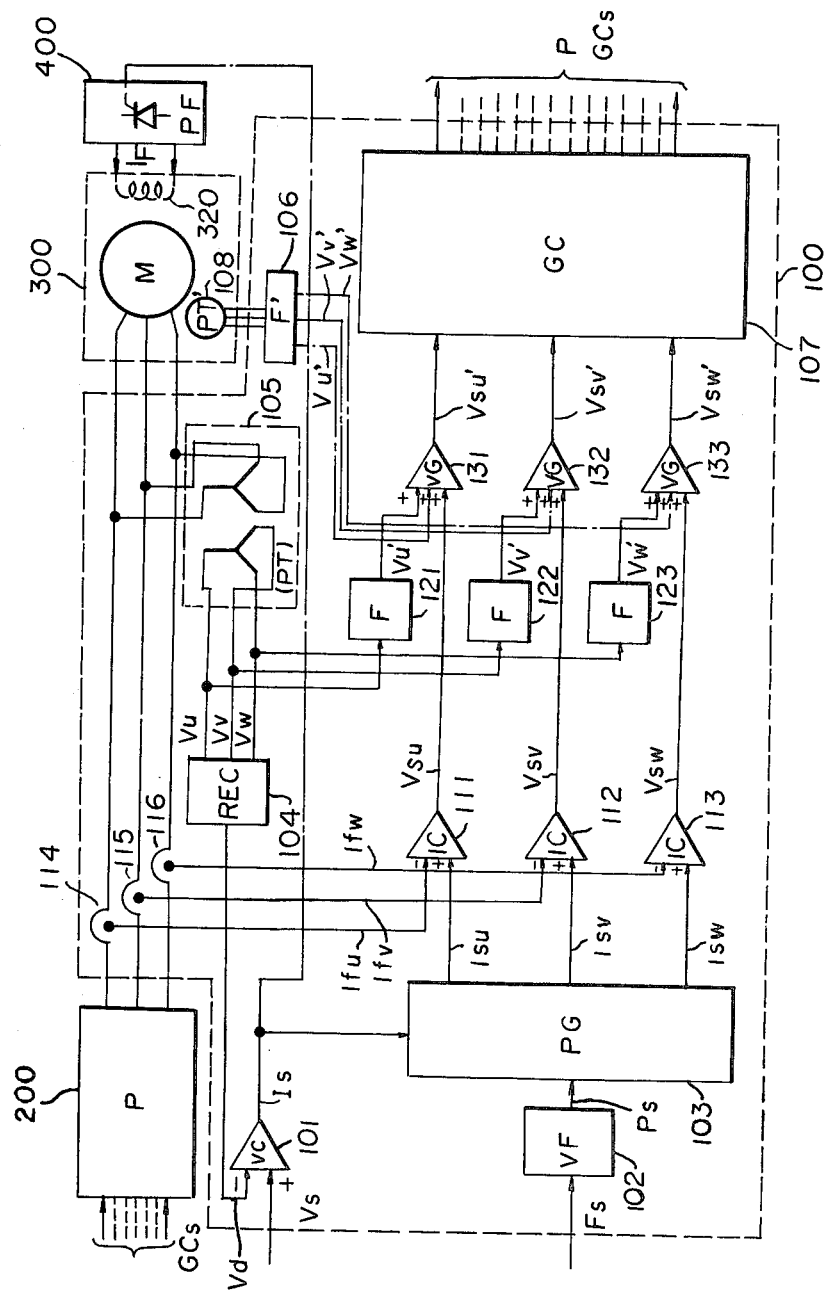
FIG. 3 is a schematic circuit diagram showing an A.C. current control system for a power supply device according to an embodiment of the invention.

Referring to FIG. 3 which shows an exemplary embodiment of the A.C. current control system according to the invention and wherein same reference numerals as those in FIG. 1 are used to designate similar circuit components, it is assumed that the load (300) is constituted by a synchronous motor having a field winding assembly (320) adapted to be excited from a field current control circuit (400). Reference numerals (121), (122) and (123) designate filter circuits, numerals (131), (132) and (133) designate voltage compensation circuits, and numeral (105) denotes a phase voltage detector, while numeral (108) denotes a magnetic flux detector followed by a magnetic flux-to-voltage converter circuit (106). A firing control circuit or gate control circuit for the A.C. power supply device (200) is designated by (107). Further, reference symbols $V_{su}$, $V_{sv}$ and $V_{sw}$ represent phase voltage command signals, $V_u'$, $V_v'$ and $V_w'$ represent phase voltage feedback signals, $V_{su}'$, $V_{sv}'$ and $V_{sw}'$ represent compensated phase voltage command signals, $GC_s$ represents gate control signals, and $I_F$ represents a field current.

As can be seen from FIG. 3, the voltage detector (105) is so connected as to detect the load voltage. The voltage rectifier (104) serves to rectify the load voltage output from the detector (105) and produce a load voltage absolute value signal as represented by $V_d$. The voltage controller (101) arithmetically determines deviation of the load voltage signal $V_d$ from the reference voltage $V_s$ and produces a current amplitude command signal $I_s$. In the other hand, the speed command voltage $F_s$ is input to the voltage-frequency converter (102) to be converted into a command pulse train $P_s$. The pattern generator (103) will then produce phase current waveform reference signals $I_{su}$, $I_{sv}$ and $I_{sw}$ of a predetermined waveform from the current amplitude command signal $I_s$ and the command pulse train $P_s$.

The phase current feedback signals $I_{fu}$, $I_{fv}$ and $I_{fw}$ are detected by the current detectors such as current transformers (114), (115) and (116) and compared with the current waveform reference signals $I_{su}$, $I_{sv}$ and $I_{sw}$ in the current waveform controllers (111), (112) and (113), respectively, whereby deviations from the reference signals are produced as phase voltage command signals $V_{su}$, $V_{sv}$ and $V_{sw}$. With a view to deriving a signal corresponding to the internal electromotive force of the synchronous motor (300), the magnetic flux detector or sensor (108) is provided to detect the magnetic flux in the motor (300) and followed by the magnetic flux-voltage converter (106) which is adapted to produce the phase voltage compensating signals $V_u'$, $V_v'$ and $V_w'$ corresponding to the internal electromotive force of the motor (300) through the filter circuit (106) adapted to filter out high harmonics. As an alternative way, such phase voltage compensating signals $V_u'$, $V_v'$ and $V_w'$ may be derived from the output signals from the phase voltage detector (105) through associated filter circuits (121), (122) and (123) for eliminating high harmonics. As a further alternative, inductive sensor coils or search coils may be disposed in the motor (300) to detect the electromotive force thereof. The phase voltage compensating signals thus obtained are then applied to the voltage compensation means (131), (132) and (133) along with the voltage command signals $V_{su}$, $V_{sv}$ and $V_{sw}$, respectively, whereby the compensated voltage command signals $V_{su}'$, $V_{sv}'$ and $V_{sw}'$ are produced from the outputs of the compensator circuits (131), (132) and (133) and supplied to the gate control circuit (107) which in turn produces the gate control signals $GC_s$ for controlling the on-off operations of solid state switches such as thyristors constituting the controlled A.C. power supply device (200). A cyclo converter or PWM inverter which allows many times of interruptions and commutations to be effected for each cycle of the output signal waveform may be preferably employed for the power supply device (200).

Figure 5:
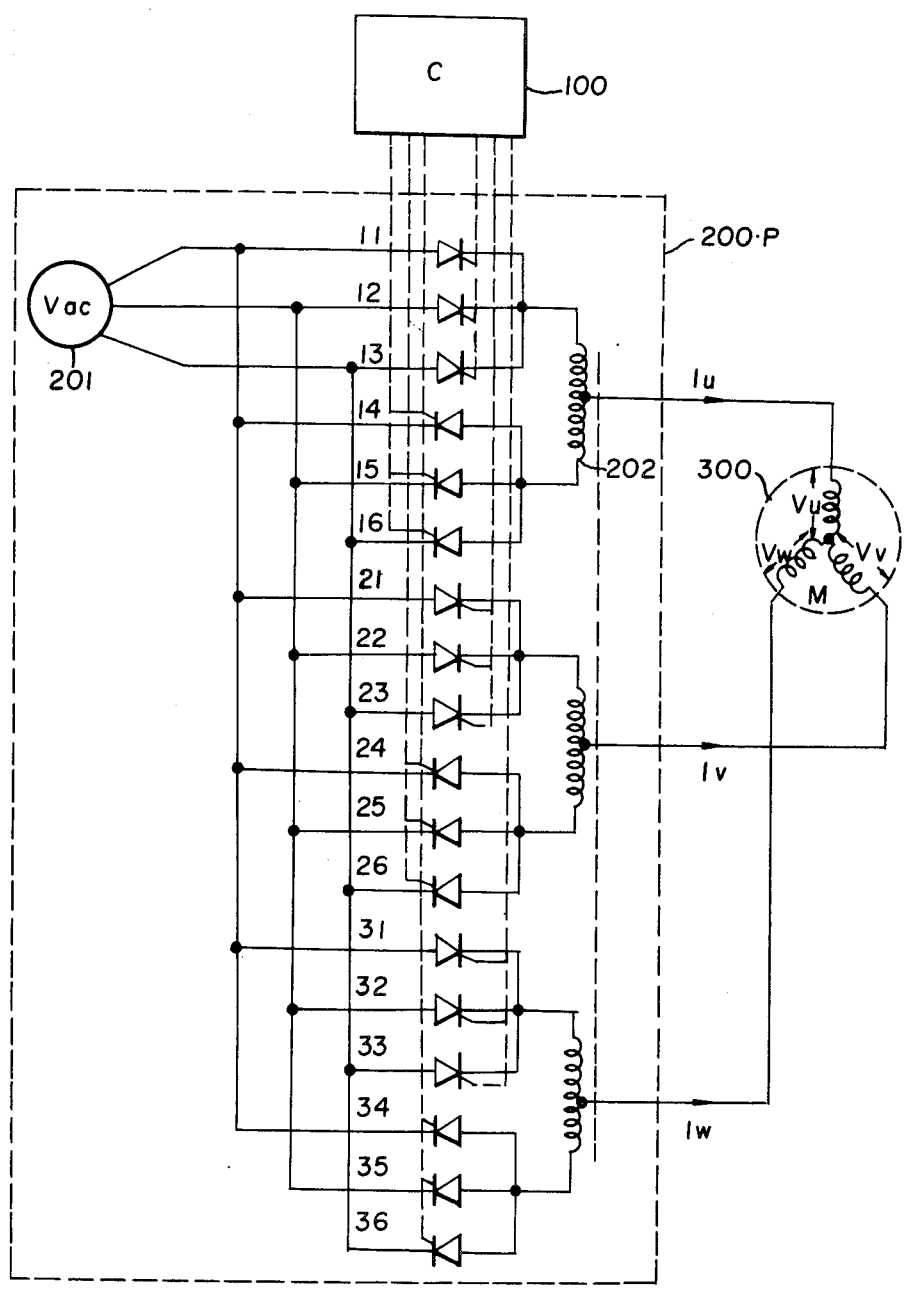
FIGS. 5 and 6 are circuit diagrams to show in detail circuit arrangements of the A.C. power supply device.

Referring to FIG. 5 which shows a circuit configuration of a cyclo converter employed for the controlled A.C. power supply device (200), reference numeral (201) denotes a three-phase A.C. source and (202) designates a D.C. reactor. Reference (300) denotes a three-phase A.C. motor while reference numeral (100) denotes the control circuit which produces the gate control signal $GC_s$ in dependence on the compensated voltage command signals described above. The gate control signal thus obtained is applied to the gate electrodes of the semiconductor switches (11) to (16), (21) to (26) and (31) to (36) provided for each phase through electrically isolated amplifiers (not shown). Each of these semiconductor switches (11) to (36) may be usually composed of a thyristor which exhibits no self-turn-off characteristic. The cyclo converter is a rectifier device which is adapted to be phase-controlled so as to produce constantly varying rectified output voltages. Since the commutation of these voltages can be effected intrinsically in dependence on the source voltages $V_{ac}$ of the A.C. power source (201), the cyclo converter can be satisfactorily operated even when it is composed of the thyristors exhibiting no self-turn-off characteristic as described above.

The cyclo converter is controlled by the feed voltage command signal $GC_s$ from the control circuit (100) on the basis of the phase control principle. The D.C. reactor (202) serves to prevent the semiconductor switches belonging to the same phase from being short-circuited to one another and additionally serves for the voltage smoothing function without incurring voltage drop in respect of the fundamental component of A.C. voltage by providing inductive coupling among the individual phases.

Figure 6:
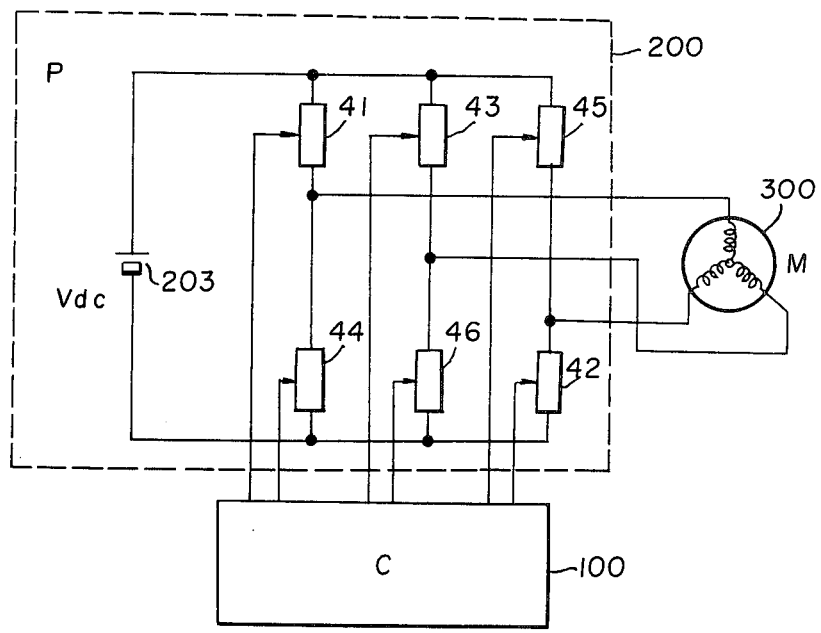
Figure 6:
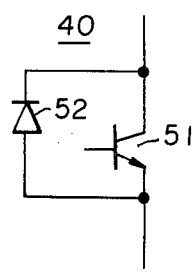
Figure 6:
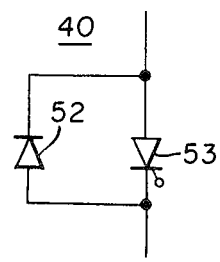

FIG. 6 shows a controlled A.C. power supply system in which PWM (pulse width modulation) inverter is employed for the power supply device (200). In the figure, reference numeral (203) designates a D.C. power source, while numerals (41) to (46) designate semiconductor switches. Each of these semiconductor switches may be composed of a transistor (51) having a diode (52) connected in anti-parallel thereto as shown in FIG. 6(b), or alternatively composed of a thyristor (53) connected in anti-parallel with diode (52) as shown in FIG. 6(c). The semiconductor switches (41) to (46) are turned on to supply controlled power to the load (300) in dependence on the gate control signal $GC_s$ available from the control circuit (100). The feeding voltage thus supplied to the load (300) consists of pulses each having an amplitude corresponding to the crest value of the source voltage and undergone the pulse width modulation.

Figure 4:
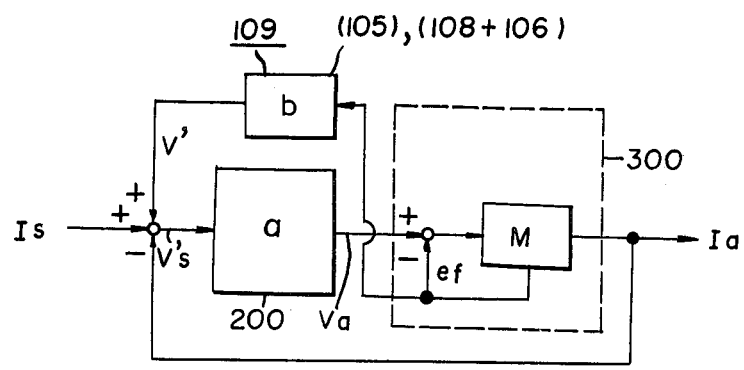
FIGS. 4 and 7 are to illustrate the operation of the system shown in FIG. 3.

FIG. 4 shows a transfer block diagram illustrating the current control system of the embodiment of the invention shown in FIG. 3. In FIG. 4, reference symbol $I_s$ represents the current waveform reference signal, $I_a$ represent phase currents, $V_s'$ represents phase feed voltage command signals, $V_a$ represents phase supply voltages, and $e_f$ represents the internal electromotive forces in the respective phases. Reference numeral (109) designates load voltage detecting means such as the potential transformer (105), the magnetic flux detector (108) or the like.

In response to the voltage command signal $V_s'$ given by the arithmetic summation of the current reference signal $I_s$, the phase current $I_a$ and the voltage compensating signal $V'$, the power supply device outputs the feed voltage $V_a$. In the case where the load is constituted by the A.C. motor, the voltage compensating signal $V'$ is derived by detecting voltage induced by the internal magnetic flux of the motor or by detecting the terminal voltage thereof. Accordingly, the internal electromotive force $e_f$ of the load is cancelled out by the component proportional to the voltage compensating component $V'$ of the phase feed voltage $V_a$, due to the fact that the voltage compensating signal $V'$ is superposed on the feed voltage $V_a$.

Figure 7:
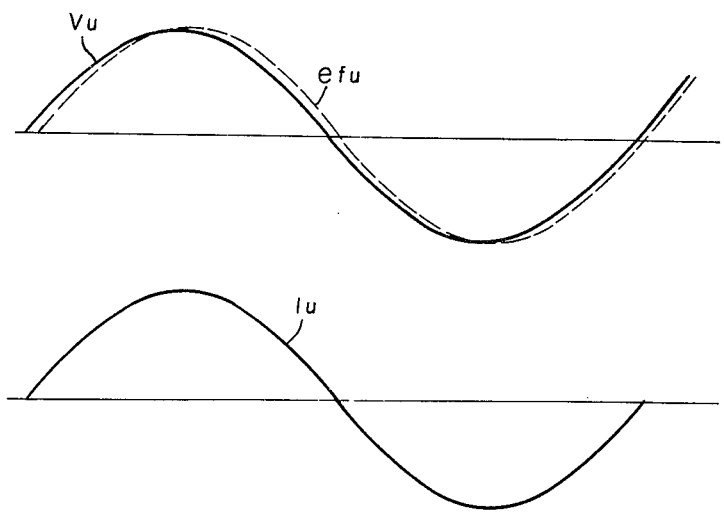

In FIG. 7, there are graphically illustrated the waveform of the fundamental wave $V_u$ of the feed voltage, the internal electromotive force $e_{fu}$ and the phase current $I_u$ for the phase u. In the illustrated example, it is assumed that no phase difference is present between the phase current and voltage. However, it will be appreciated that such phase difference will be produced as arbitrarily determined in dependence on the power-factor of the load.

From the foregoing description, it will be understood that the deviation in the current control can be suppressed to a minimum in accordance with the arrangement of the first embodiment of the invention, which is effective particularly in the case where the load is constituted by an A.C. motor exhibiting internal electromotive forces and permits the current control to be carried out with a predetermined waveform pattern in a high speed range of the motor in which the internal electromotive force is increased. Furthermore, it is possible to obtain required torques over a wider range of variable speeds. In the foregoing description of the first embodiment, it has been assumed that the load is composed of a synchronous machine. However, similar advantageous effect can be attained also in the case of inductive machines and other various alternating machines. By making use of the relations among the phase currents and voltages of the three phase A.C. system such that $$I_w = -(I_u + I_v) \text{ and } V_w = -(V_u + V_w),$$

each one of the current detectors (114) to (116), the voltage detectors (105), the magnetic flux detectors (108), the current controllers (111) to (113) or the like may be spared for one phase. Further, the power supply device is not restricted to the illustrated ones but many various circuit configurations can be adopted therefor. Many various control systems utilizing the internal electromotive force or the like signals may readily occur to those skilled in the art without departing from the scope of the invention.

Figure 8:
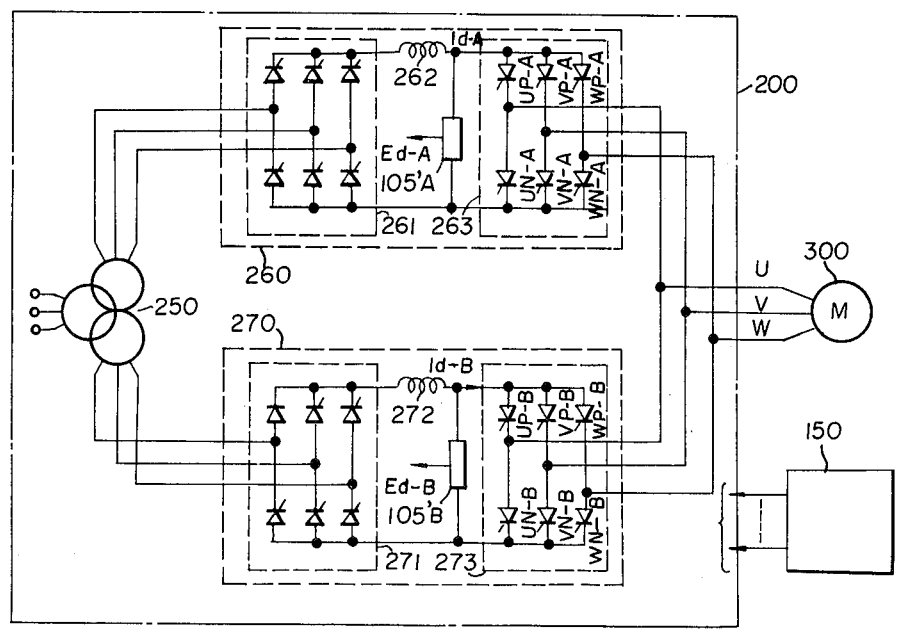
FIG. 8 is a schematic circuit diagram showing another embodiment of the A.C. current control system for a power supply device implementing the teachings of the invention.
Figure 9:
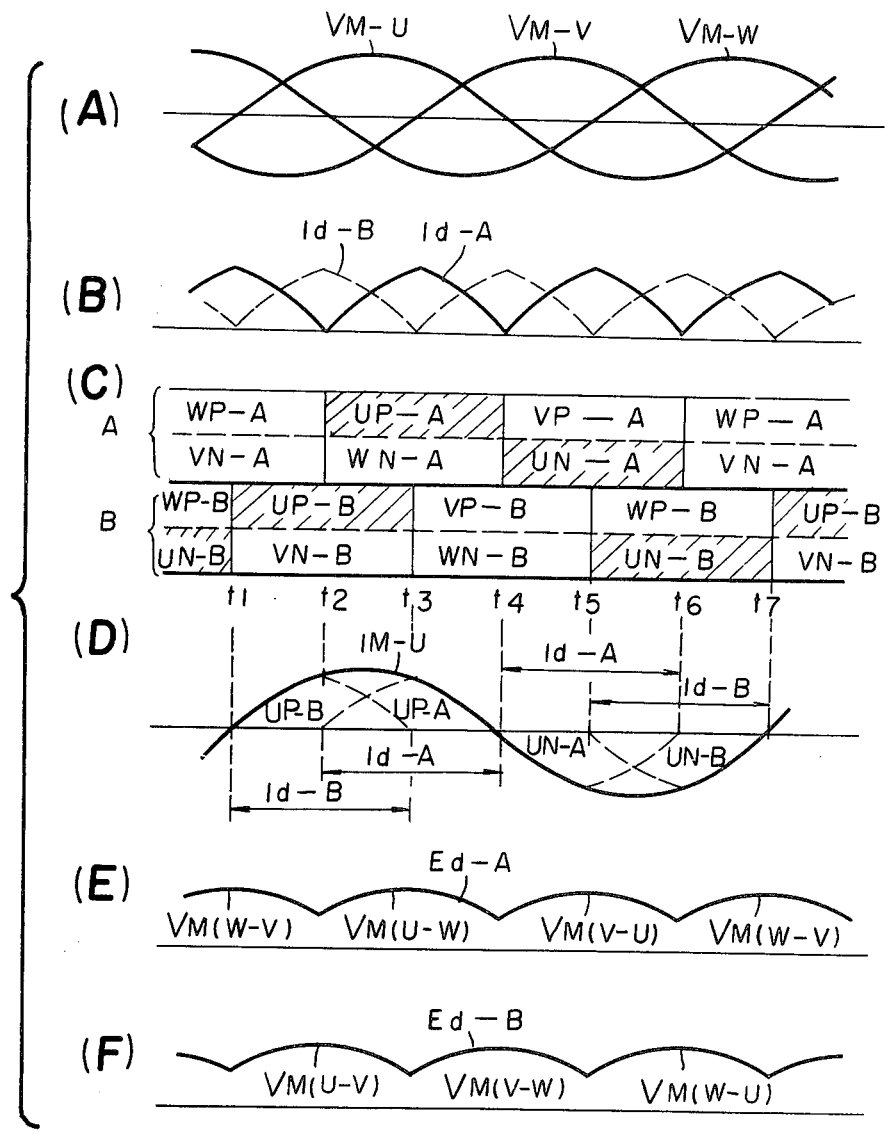
FIGS. 9 and 10 are to illustrate operations of the control system shown in FIG. 8.
Figure 10:
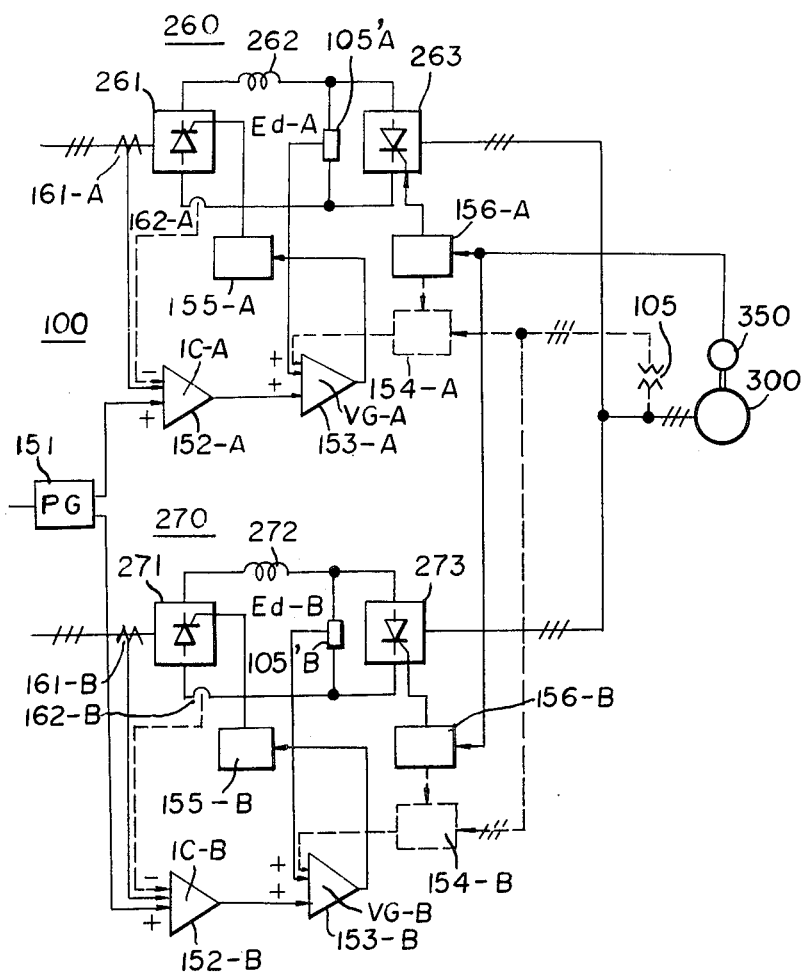

FIGS. 8 to 10 illustrate another exemplary embodiment of the invention. Referring to FIG. 8, the power supply device (200) is composed of a power source transformer (250), an A-group power supply circuit (260) and a B-group power supply circuit (270). Reference numeral (150) designates a control circuit for the power supply device (200). The A-group power supply circuit (260) may be composed of a power rectifier (261) including six semiconductor element arms for generating pulsating D.C. currents, a reactor (262) and a power inverter (263) including six semiconductor element arms (referred to as UP-A, VP-A, WP-A, UN-A, VN-A and WN-A as illustrated) for switching the pulsating D.C. current in an appropriate way. In a similar manner, the B-group power supply circuit (270) is composed of a power rectifier (271), a reactor (272) and a power inverter (273) (the semiconductor elements of six arms are referred to as UP-B, VP-B, WP-B, UN-B, VN-B and WN-B, respectively). The reactors (262) and (272) connected in the D.C. paths of the A-group and B-group power supply circuits may be magnetically coupled, as will be described hereinafter.

Next, referring to FIG. 9, description will be made on the operations when an A.C. motor is driven by A.C. current of a substantially sine waveform (or course, alternating current of a trapezoidal waveform or of a segment-approximated sine waveform may be alternatively used) from the power supply device (200). In FIG. 9, curves at (A) represent waveforms of phase voltages of the motor (for the three phases of VM-U, VM-V and VM-W), and curves at (B) represent the waveforms of the pulsating D.C. currents wth the solid curve representing the D.C. current $I_d$-A of the A-group power circuit while the broken line curve representing the waveform of the D.C. current $I_d$-B of the B-group power circuit. The D.C. currents $I_d$-A and $I_d$-B are pulsated each in a substantially triangular waveform at a frequency three times as high as the motor frequency in such a manner that the current increase periods of one D.C. current are located in opposition to the current decrease periods of the other D.C. current, as shown in the drawing. The waveform control of these D.C. currents are performed through the phase control of the associated power rectifiers (261) and (271) (current control with the aid of a reference current waveforms of a predetermined pattern).

The operations for converting the pulsating D.C. currents into A.C. currents of a substantially sine waveform through the switching operations of the power inverters (263) and (273) are illustrated at (C) and (D) in FIG. 9. More particularly, firing signals for the power inverters are illustrated at (C) wherein the gate signals (UP-A, VP-A, ..., UN-B) correspond to the respective arms of the power inverters (263) and (273). (For example, the firing signal UP-A means that the corresponding arm UP-A of the power inverter (263) is conducting at that time.) In this connection, it will be noted that the U-phase current of the motor is determined by the hatched firing signals which make the corresponding arms to be conductive. Such operation for one phase is illustrated at (D). More specifically, the arm UP-B of the B-group power inverter is made conductive during a period from $t_1$ to $t_3$, while the arm UP-A of the A-group power inverter is turned on during a period of $t_2$ to $t_4$, whereby a positive half wave of the U-phase motor current having a substantially sine waveform can be obtained. In a similar manner, a negative half wave can be obtained by turning on the arms UN-A and UN-B during periods of $t_4$ to $t_6$ and $t_5$ to $t_7$, respectively. Same will apply to the generation of the motor currents for the phases V and W. Then, input D.C. currents $E_d$-A and $E_d$-B of the power inverters will be of a three-phase half-wave rectified waveform, as illustrated at (E) and (F) in FIG. 9. For example, since the arms UP-A and WN-A become conductive during a period of $t_2$ to $t_4$, the input D.C. voltage $E_d$-A corresponds to an interphase voltage $V_M$(U-W). In this connection, it is to be noted that the D.C. currents $I_d$-A and $I_d$-B are so pulsated that the current increase periods for one of the A- and B-groups are positioned in opposition to the current decrease period for the other group power circuit. In other words, the increase period of the current $I_d$-A occurs during the decrease period of the D.C. current $I_d$-B. Accordingly, the reactors (262) and (272) provided in the power supply device should preferably be magnetically coupled with such polarity that the D.C. current is decreased when the current $I_d$-A increases, thereby to facilitate the waveform control for pulsating the D.C. currents.

FIG. 10 shows an exemplary embodiment of a control block including voltage detecting means (105'A) and (105'B) and voltage compensators (153A) and (153B) for eliminating influences of the internal electromotive force at the time of controlling the current waveform in the embodiment shown in FIG. 8. Since the control of current waveform is carried out separately for each of A- and B-groups in the case of the embodiment illustrated in FIG. 8, detection of the voltage to be sensed is effected for each group. In FIG. 10, reference numeral (350) denotes a rotor position detector, numeral (151) designates a current pattern generator for deriving the pulsating D.C. current described above, numeral (152) designates a current control circuit, numeral (153) designates a voltage compensator, numeral (154) designates a converter for converting the motor voltage into a feedback signal for compensating the voltage separately for each of the A- and B-groups, numeral (155) designates a firing signal generator circuit for the power rectifier, and numeral (156) designates a firing current generator circuit for the power inverter adapted to produce the firing signal shown at (C) in FIG. 9. Reference numerals (161) and (162) denote an A.C. converter and a D.C. converter, respectively, either one of which may be used for obtaining the current feedback signal. The suffixes "A" and "B" attached to the reference numerals (152) to (162) respresent the groups to which the associated circuit components belong.

For the voltage signal to be detected and applied to the voltage compensator (153) as the positive feedback signal, it is possible to utilize either the input D.C. voltage ($E_d$-A or $E_d$-B) for the power inverter such as shown by solid line at (B) in FIG. 9 or the motor voltage converted through the converter (154) to the voltage corresponding to the input D.C. voltage ($E_d$-A or $E_d$-B) as shown by the broken line at (B) in FIG. 9. In the latter case, the three-phase A.C. motor voltage is converted to the three-phase half-wave rectified voltage waveform on the basis of the firing signal from the firing signal generating circuit (156) for the power inverter. For example, two sets of three-phase half-wave synchronous rectifiers will be sufficient for the above-mentioned conversion. The detection of the motor voltage can also be accomplished through detection of the magnetic flux by using the magnetic flux-voltage converter as described hereinbefore in conjunction with FIG. 3. With such positive feedback voltage compensation, influences of the internal electromotive force such as deviations in current or phase which will possibly occur upon controlling the current waveform can be significantly reduced, whereby the current control can be effected with a predetermined pattern of the current waveform.

It will now be appreciated from the foregoing description that deviations in the current control which are likely to occur upon variations in the load can be reduced through the voltage compensation carried out in accordance with the teachings of the invention.

What is claimed is:

1. In an A.C. current control system including an A.C. load exhibiting an internal counter electromotive force and a power supply device for supplying A.C. current to the A.C. load, control means for controlling the waveform of the current fed to said load comprising:
   reference current waveform generator means for generating a reference current waveform;
   load current waveform detector means for detecting the waveform of the load current;
   load voltage detector means for detecting the load voltage to derive a voltage compensating signal; and
   closed loop control circuitry means for comparing the output from said reference current waveform generator means with the output from said load current waveform detector means to generate an uncompensated voltage command signal and arithmetically summing the uncompensated voltage command signal with the voltage compensating signal to generate a compensated voltage command signal to control correspondingly said power supply device to output a feed voltage, wherein the internal counter electromotive force of the load is cancelled out from the feed voltage by summing the voltage compensating signal with the uncompensated voltage command signal, whereby deviation in current control due to the internal counter electromotive force of the load is suppressed to a minimum.

2. An A.C. current control system according to claim 1, wherein said reference current waveform generator means comprises voltage control means for comparing output signal from said load voltage detector means with a reference voltage valve thereby to produce an output signal corresponding to deviation of said output signal of said load voltage detector means from said reference voltage value, means for generating a command pulse train in response to a command speed signal, and a waveform pattern generator for producing said reference current waveform from the output signal of said voltage control means and said command pulse train.

3. An A.C. current control system according to claim 1, wherein said power supply device is composed of a cyclo converter constituted by semiconductor switches.

4. An A.C. current control system according to claim 1, wherein said power supply device is composed of an inverter constituted by semiconductor switches.

5. An A.C. current control system according to claim 1, wherein said load voltage detector means is composed of a potential transformer.

6. An A.C. current control system according to claim 1, wherein said A.C. load is constituted by an electric motor.

7. An A.C. current control system according to claim 6, wherein said load voltage detector means is constituted by a search coil coupled in said A.C. load.

8. An A.C. current control system according to claim 6, wherein said load voltage detecting means is composed of a magnetic flux-voltage converter adapted to detect magnetic flux in said electric motor and convert the detected magnetic flux into a voltage corresponding to electromotive force of said electric motor.

* * * * *